United States Patent
Lai et al.

(10) Patent No.: US 11,476,698 B1
(45) Date of Patent: Oct. 18, 2022

(54) SYSTEM FOR CHARGING SMALL-CAPACITY BATTERY FROM LARGE-CAPACITY BATTERY

(71) Applicant: Shenzhen Lowpower Semiconductor Co., Ltd, Shenzhen (CN)

(72) Inventors: Zheren Lai, Shenzhen (CN); Xingke Dai, Shenzhen (CN)

(73) Assignee: SHENZHEN LOWPOWER SEMICONDUCTOR CO., LTD., Shenzhen (CN)

( * ) Notice: Subject to any disclaimer, the term of this patent is extended or adjusted under 35 U.S.C. 154(b) by 0 days.

(21) Appl. No.: 17/730,517

(22) Filed: Apr. 27, 2022

(30) Foreign Application Priority Data

Aug. 9, 2021 (CN) .......................... 202110906922.9

(51) Int. Cl.
*H02J 7/34* (2006.01)
*H02J 7/00* (2006.01)

(52) U.S. Cl.
CPC ............ *H02J 7/342* (2020.01); *H02J 7/0034* (2013.01); *H02J 7/0049* (2020.01)

(58) Field of Classification Search
CPC ......... H02J 7/342; H02J 7/0049; H02J 7/0034
USPC ....................................................... 320/103
See application file for complete search history.

(56) References Cited

U.S. PATENT DOCUMENTS

| | | |
|---|---|---|
| 7,183,756 B1 | 2/2007 | Dikken et al. |
| 8,339,108 B2 | 12/2012 | Li et al. |
| 9,287,731 B2 | 3/2016 | Holloway et al. |
| 9,742,209 B2 * | 8/2017 | Fernald ................. G06F 1/3243 |
| 9,966,781 B2 * | 5/2018 | Wei .......................... H02J 7/007 |
| 10,075,007 B2 * | 9/2018 | Langlinais .............. G06F 1/263 |
| 10,505,361 B2 | 12/2019 | Duan et al. |
| 11,114,838 B2 | 9/2021 | Li |
| 2006/0176017 A1 * | 8/2006 | Waguespack ......... H02J 7/0044 320/115 |
| 2008/0054843 A1 | 3/2008 | Liu |
| 2022/0085624 A1 * | 3/2022 | Deng .................... H02J 7/0019 |

FOREIGN PATENT DOCUMENTS

| | | | | |
|---|---|---|---|---|
| CN | 111277025 B | * | 11/2020 | ............ H02J 7/0013 |
| CN | 113746148 A | * | 12/2021 | ............. H02J 7/007 |

* cited by examiner

*Primary Examiner* — M Baye Diao
(74) *Attorney, Agent, or Firm* — Brooks Kushman P.C.

(57) ABSTRACT

A system for charging a small-capacity battery from a large-capacity battery. The large-capacity battery subsystem and the small-capacity battery subsystem cooperate with each other in different stages of a charging cycle of the small-capacity battery. The large-capacity battery subsystem includes a large-capacity battery, a large-capacity battery charging circuit and a constant-voltage and constant-current circuit which generates either a constant voltage or a constant current. The small-capacity battery subsystem includes a small-capacity battery and a linear charging circuit which uses the constant voltage or the constant current to charge the small-capacity battery. The charging cycle of the small-capacity battery includes a CC stage and a CV stage. In the CC stage, the linear charging circuit meets the ideal diode characteristics and outputs a constant current. In the CV stage, the linear charging circuit meets the linear charging characteristics and outputs a constant voltage.

20 Claims, 5 Drawing Sheets

SYSTEM FOR CHARGING SMALL-CAPACITY BATTERY FROM LARGE-CAPACITY BATTERY

CROSS-REFERENCE TO RELATED APPLICATION

Pursuant to 35 U.S.C. § 119 and the Paris Convention, this application claims the benefit of Chinese Patent Application No. 202110906922.9 filed Aug. 9, 2021, the content of which is incorporated herein by reference.

TECHNICAL FIELD

The present application relates to the field of charging, and in particular relates to a system for charging a small-capacity battery from a large-capacity battery.

BACKGROUND

In recent years, many electronic devices equipped with a dual-battery system (such as true wireless stereo (TWS) earphones or electronic cigarettes) have appeared on the market. In the dual-battery system, a subsystem with a large-capacity battery may be included which can perform a battery charging for a subsystem with a small-capacity battery. Battery life of the entire system as well as a charging speed of the small-capacity battery are two important performance indicators.

In order to save cost, it is provided only two connection wires between the above-mentioned large-capacity battery subsystem and the small-capacity battery subsystem, namely, one power wire and one ground wire. How to improve the operating time of the electronic device equipped with a dual-battery system and the charging speed of the small-capacity battery under the condition of only two connection wires being provided are current research hotspots in the industry.

SUMMARY

One objective of the present application is to provide a system for charging a small-capacity battery from a large-capacity battery, which is beneficial to improve the charging speed of the small-capacity battery.

In accordance with an embodiment of the present application, a system for charging a small-capacity battery from a large-capacity battery is provided. The system for charging a small-capacity battery from a large-capacity battery includes a large-capacity battery subsystem and a small-capacity battery subsystem. These battery subsystems cooperate with each other in different stages of a charging cycle of the small-capacity battery.

The large-capacity battery subsystem includes a constant-voltage and constant-current circuit, a large-capacity battery and a large-capacity battery charging circuit. The constant-voltage and constant-current circuit is configured to generate a constant voltage or a constant current using energy in the large-capacity battery and supply the constant voltage or the constant current to the small-capacity battery subsystem as a power input, and the large-capacity battery charging circuit is configured to charge the large-capacity battery.

The small-capacity battery subsystem includes a linear charging circuit having ideal diode characteristics and a small-capacity battery. The linear charging circuit having ideal diode characteristics is configured to charge the small-capacity battery using the constant voltage or the constant current output from the large-capacity battery subsystem.

The charging cycle of the small-capacity battery includes a constant-current (CC) stage and a constant-voltage (CV) stage. In the CC stage, the linear charging circuit having ideal diode characteristics meets the ideal diode characteristics, and in the CV stage, the linear charging circuit having ideal diode characteristics meets linear charging characteristics.

In the CC stage, the large-capacity battery subsystem is configured to output a constant current; when the charging cycle of the small-capacity battery enters into the CV stage, the large-capacity battery subsystem is configured to output a constant voltage.

In accordance with an embodiment of the present application, an electronic device is also provided. The electronic device includes the above-mentioned system for charging a small-capacity battery from a large-capacity battery.

Compared with the existing technology, the embodiments of the present application have the following beneficial effects: when the small-capacity battery is charged in the CC stage, the large-capacity battery subsystem outputs a constant current, meanwhile the charging circuit of the small-capacity battery subsystem is matched with a circuit having ideal diode characteristics, which enables the voltage difference between the input voltage and the output voltage of the small-capacity battery charging circuit to be very low, such that high efficiency can be achieved, and the waste of battery energy can be reduced, thereby increasing the operating time of the large-capacity battery. Also due to high efficiency, a higher charging current can be allowed without generating a large amount of heat, thereby achieving a fast charging. When the small-capacity battery is charged in the CV stage, since the battery voltage is a given parameter, the large-capacity battery subsystem is coordinated to provide the constant voltage being slightly higher (such as 300 mV) than the battery voltage, thereby achieving the high efficiency. Since the charging circuit of the small-capacity battery has ideal diode characteristics, when the small-capacity battery is charged in the CC stage, as long as the large-capacity battery subsystem outputs a constant current, a lower voltage difference between the input voltage and the output voltage of the charging circuit of the small-capacity battery will be naturally maintained. Therefore, high efficiency can be achieved without involving a microprocessor for communication.

BRIEF DESCRIPTION OF THE DRAWINGS

In order to illustrate technical solutions in the embodiments of the present application more clearly, the drawings that need to be used in description of the embodiments will be briefly described herein below. Obviously, the drawings in the following description are merely some embodiments of the present application, for those of ordinary skill in the art, other drawings may also be obtained in accordance with these drawings without creative labor.

DETAILED DESCRIPTION OF THE EMBODIMENTS

Figure 1:
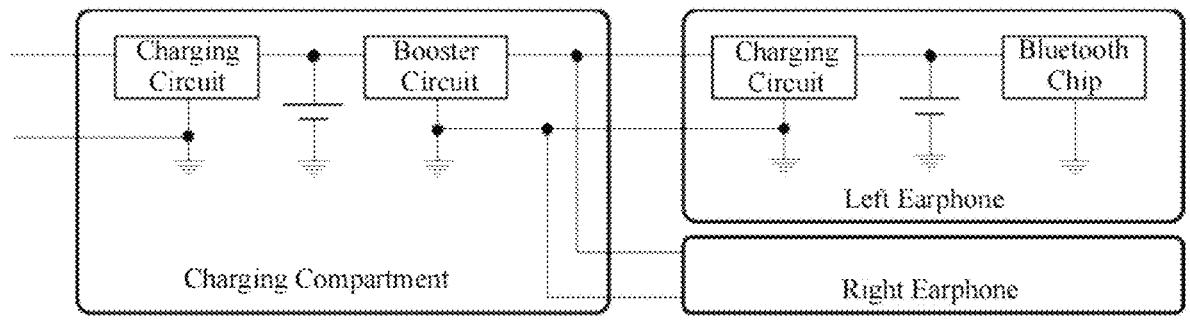
FIG. 1 is a block diagram of a simplified system of TWS Bluetooth earphone in the related technical solution.

In order to make the objectives, technical solutions and advantages of the present application more comprehensible, the present application will be further described in detail below with reference to the drawings and embodiments. It should be understood that the embodiments specifically described here are merely used to illustrate the present application and are not intended to limit the present application.

It should be noted that when an element is referred to as being "fixed to" or "disposed/provided on" another element, it can be directly on the other element or indirectly on the other element. When an element is referred to as being "connected to" another element, it can be directly connected to the other element or indirectly connected to the other element.

It should be understood that direction or position relationship indicated by terms of "length," "width," "upper," "lower," "front," "back," "left," "right," "vertical," "horizontal," "top," "bottom," "inner," "outer" and the like, are based on the orientation or position relationship shown in the drawings, which are merely used for the convenience of describing the present application and simplifying the description, rather than indicating or implying that the device or element referred to must have a specific orientation, be constructed and operated in a specific orientation, it thus cannot be understood as a limitation to the present application.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of these features. In the description of the present application, the phrases "a/the plurality of" means two or more, unless otherwise specifically defined.

Generally, a dual-battery system includes a large-capacity battery subsystem (such as a charging compartment subsystem) and at least one small-capacity battery subsystem (such as an earphone subsystem). FIG. 1 is a block diagram of a simplified system of TWS Bluetooth headset in the related technical solution. The system includes one charging compartment subsystem and two earphone subsystems.

Figure 2:
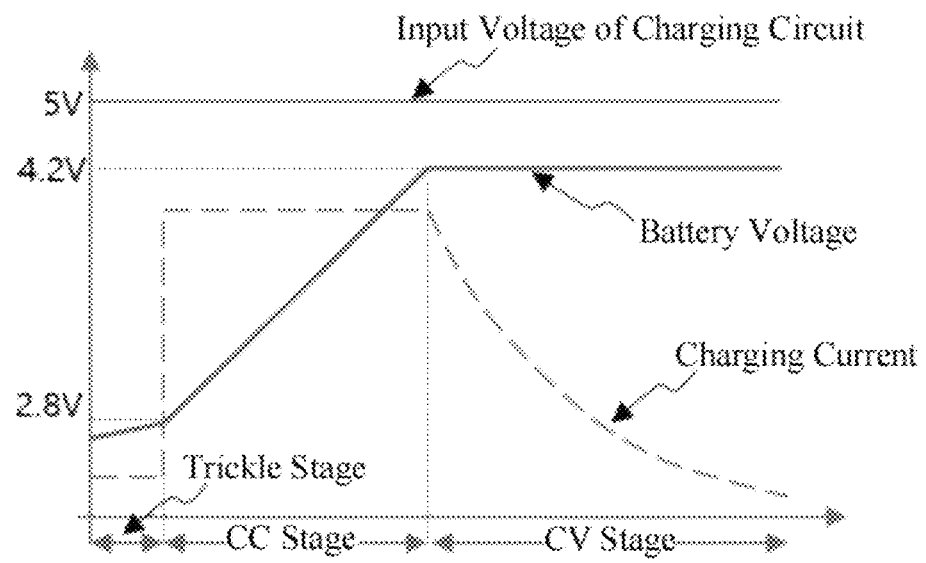
FIG. 2 shows voltage and current waveforms during a charging cycle in the related technical solution.
Figure 3:
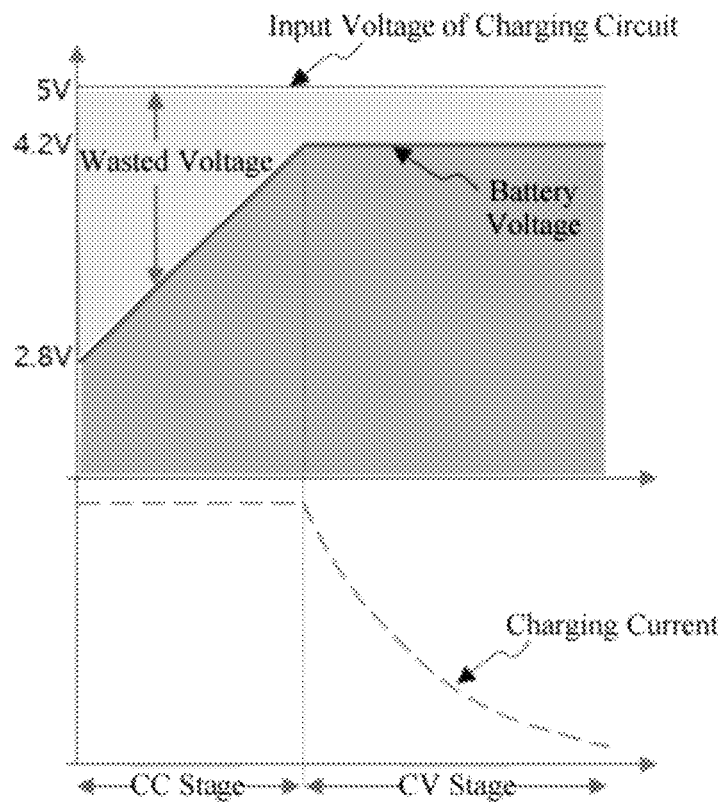
FIG. 3 is a diagram of wasted voltage during the charging cycle of earphone in the related technical solution.

FIG. 2 shows a charging cycle of a lithium-ion battery in the related technical solution. The float charge voltage of the lithium-ion battery has high accuracy requirements (such as within 1%), and may have typical values of 4.2V, 4.35V and 4.4V. Here, 4.2V is used as an example to illustrate the present application. In order to be fast without being overcharged when charging the battery, the charging process of the lithium-ion battery mainly includes a constant current (CC) stage and a constant voltage (CV) stage. In order to ensure that the battery in the earphone is fully charged, the existing typical approach is to provide a constant voltage of 5V to the input of the charging circuit in the earphone, and then determine the charging stage according to the voltage of the battery. Since the battery voltage in the battery compartment is only 4.2V at the highest, the charging compartment needs to use a booster circuit to generate the above voltage of 5V, as shown in FIG. 1. Such approach has the following disadvantages:

As the charger in the earphone is a linear charger, the efficiency of charging is low, which leads to a waste of battery energy in the charging compartment and the operating time is not fully utilized. As shown in FIG. 2, at the beginning of the CC stage, the voltage of the battery in the earphone is 2.8V, the input voltage of the charging circuit of the earphone is 5V, hence, the voltage difference of 2.2V is wasted. At this time, the power-conversion efficiency is only 2.8V/5V, that is 56%. The waste of power during an entire charging process is shown in FIG. 3. Since the trickle-charging stage often does not occur or the duration is very short if it does occur, this stage is not included in FIG. 3. Also, because the charger in the earphone is a linear charger, it generates a lot of heat, moreover, the earphone is small in size and the internal printed circuit board has a small area, the allowed temperature rise will limit how large the charging current could be, hence, the charging time is long. In the above example, the wasted power (a product of the voltage of 2.2V and the charging current in the CC stage) will be converted into heat, contributing to the temperature rise of the earphone. In order to keep the temperature from rising too high, the charging current cannot be too high.

Figure 4:
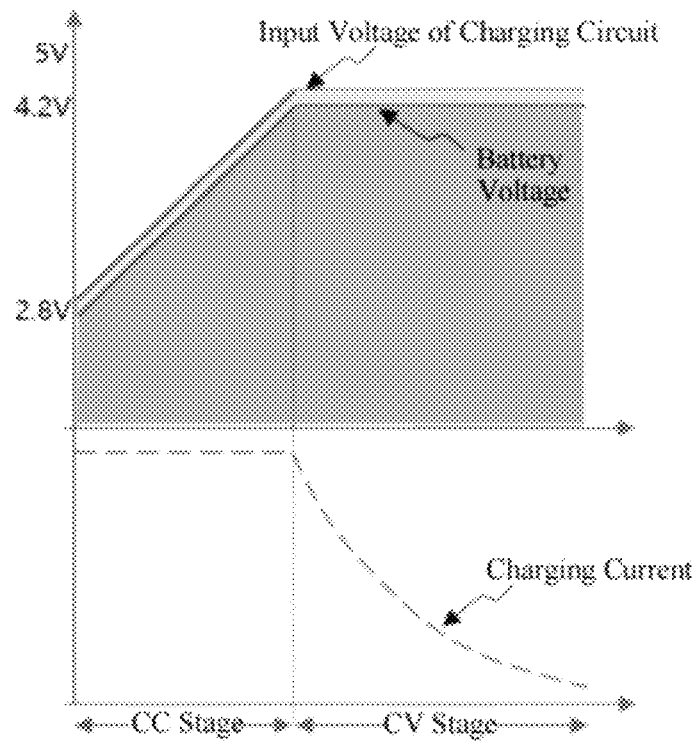
FIG. 4 is a diagram of voltage and current of a charging circuit of the earphone in CC and CV stages with a low-voltage-difference operating mode in the related technical solution.

In order to overcome the above shortcomings, another related technical solution is provided that the output voltage of the charging compartment tries to follow (slightly higher than) the battery voltage of the earphone. The voltage and current waveforms of the charging circuit of the earphone during a charging cycle is shown in FIG. 4. Since only two connection wires are provided between the charging compartment and the earphone, the charging compartment does not know the battery voltage of the earphone. A communication between the charging compartment and the earphone is required for the charging compartment to know what voltage is needed to follow the battery voltage of the earphone. Such approach has the following disadvantages:

The charging compartment must contain a microprocessor to perform the communication. The above technique cannot be used for a charging compartment that does not have a microprocessor in side. The charging process must be stopped during communication, as the earphone has only two wires, namely, a ground wire and a power wire. The power wire is used as a communication signal line during communication. Since the reference voltage of the charging compartment and the reference voltage of the earphone may not be identical, the output of the charging compartment needs to have additional margin to ensure a sufficient voltage difference between the input and the output of the charging circuit of the earphone. As a result, the voltage difference may be too large, resulting in a waste of energy.

Figure 5:
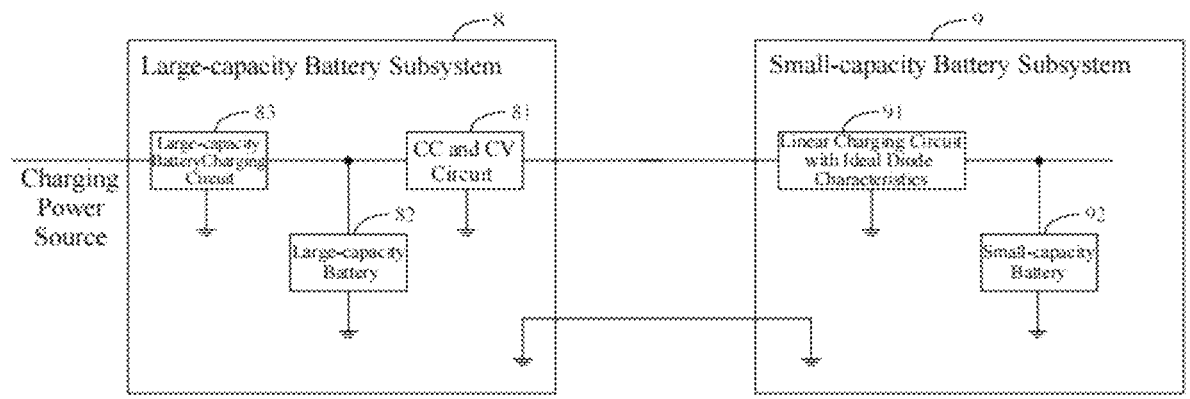
FIG. 5 is a block diagram of a high-efficiency charging method for a large-capacity battery subsystem and a small-capacity battery subsystem in accordance with an embodiment of the present application.

FIG. 5 shows a block diagram of a system for charging a small-capacity battery from a large-capacity battery according to the present application. The system for charging the small-capacity battery from the large-capacity battery includes a large-capacity battery subsystem 8 and a small-capacity battery subsystem 9. In order to achieve high efficiency, the large-capacity battery subsystem 8 and the small-capacity battery subsystem 9 cooperate with each other in different stages during a charging cycle of the small-capacity battery.

The large-capacity battery subsystem 8 includes a constant-voltage and constant-current circuit 81, a large-capacity battery 82, and a large-capacity battery charging circuit 83. The constant-voltage and constant-current circuit 81 is configured to generate a constant voltage or a constant current using energy in the large-capacity battery and supply the constant voltage or the constant current to the small-capacity battery subsystem 9 as a power input. The large-capacity battery charging circuit 83 is configured to charge the large-capacity battery 82.

The small-capacity battery subsystem 9 includes a linear charging circuit having ideal diode characteristics 91 and a small-capacity battery 92. The linear charging circuit having ideal diode characteristics 91 is configured to charge the small-capacity battery 92 using the constant voltage or the constant current output from the large-capacity battery subsystem 8.

The charging cycle of the small-capacity battery 92 includes a CC stage and a CV stage. In the CC stage, the linear charging circuit having ideal diode characteristics 91 meets the ideal diode characteristics; and in the CV stage, the linear charging circuit having ideal diode characteristics 91 meets linear charging characteristics.

In the CC stage, the large-capacity battery subsystem 8 is configured to output a constant current; when the charging cycle of the small-capacity battery 92 enters into the CV stage, the large-capacity battery subsystem 8 is configured to output a constant voltage with its voltage higher than the battery voltage.

When the small-capacity battery is charged in the CC stage, the large-capacity battery subsystem outputs a constant current, meanwhile the charging circuit of the small-capacity battery subsystem is matched with a circuit having ideal diode characteristics, resulting in a very low voltage difference between the input voltage and the output voltage of the small-capacity battery charging circuit, such that high efficiency can be achieved, the waste of battery energy of the large capacity is reduced, and thereby increasing the operating time of the large-capacity battery. Also due to high efficiency, a higher charging current can be allowed without generating a large amount of heat in the charging circuit of the small-capacity battery subsystem, thereby achieving fast charging. When the small-capacity battery is charged in the CV stage, since the battery voltage is known at the time of designing the system (such as 4.2V, 4.35V, or 4.4V), the large-capacity battery subsystem is coordinated to output a constant voltage that is slightly higher (such as 300 mV) than the small-capacity battery voltage, thereby achieving the high efficiency. Since the charging circuit of the small-capacity battery has ideal diode characteristics, when the small-capacity battery is charged in the CC stage, as long as the large-capacity battery subsystem outputs a constant current, a low voltage difference between the input voltage and the output voltage of the charging circuit of the small-capacity battery will be naturally maintained. Therefore, high efficiency can be achieved without involving a microprocessor for communication.

Figure 6:
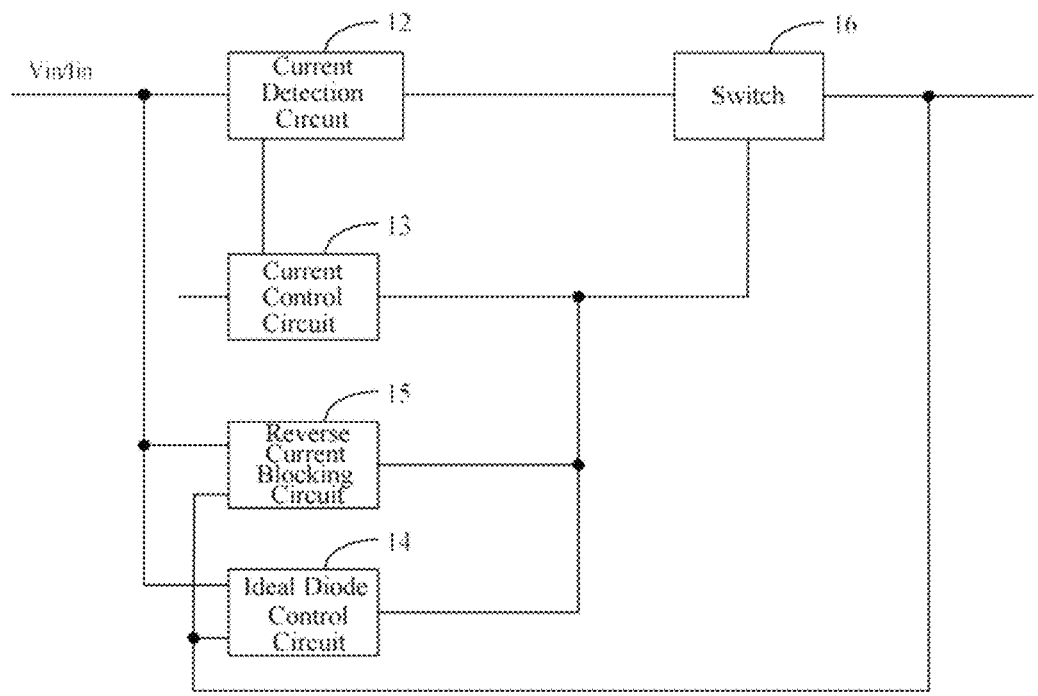
FIG. 6 is a block diagram of a linear charging circuit in accordance with an embodiment of the present application.

FIG. 6 shows a block diagram of a linear charging circuit having ideal diode characteristics in accordance with a preferred embodiment of the present application. For ease of description, only the parts related to this embodiment are described in detail here.

The linear charging circuit as above-described includes a current detection circuit 12, a current control circuit 13, an ideal diode control circuit 14, a reverse current blocking circuit 15 and a switch 16.

The current detection circuit 12 is configured to detect a constant current Iin to output a sampling current;

The current control circuit 13, being connected to the switch 16, is configured to control the switch 16 to transmit the constant current Iin as a charging current of the battery when the sampling current is smaller than or equal to a first reference current and the constant current Iin is greater than or equal to a critical current. The first reference current is greater than the critical current.

The ideal diode control circuit 14, being connected to the current control circuit 13 and the switch 16, is configured to control the drain-source voltage drop of the switch 16 to stabilize at the critical voltage when the constant current Iin is smaller than the critical current and the battery voltage is smaller than the first threshold voltage. In which, the critical voltage is the product of the critical current and the on-resistance of the switch when the switch 16 is saturated.

The reverse current blocking circuit 15, being connected to the ideal diode control circuit 14, the current control circuit 13 and the switch 16, is configured to control the switch 16 to be turned off when the charging is stopped to prevent current from flowing from the small-capacity battery to the input end of the small-capacity battery subsystem.

The current control circuit 13 is also configured to control the charging current output from the switch 16 to stabilize at the first reference current when the sampling current is greater than the first reference current.

When the constant current is a relatively large current (when the constant current is greater than the critical current and lower than the first reference current), through the current control circuit, the constant current serves as the charging current is achieved. When the constant current is a relatively small current (the constant current is smaller than the critical current, and the battery voltage is smaller than the first threshold voltage), a drain-source voltage drop of the switch is stabilized at the critical voltage to maintain a low-dropout charging. When the charging is stopped, the switch is turned off to prevent current from flowing from the small-capacity battery to the input end of the small-capacity battery subsystem, thereby achieving the low-dropout charging without a microprocessor. In practical applications, the linear charging circuit can be installed in an electronic device equipped with a dual-battery system, so that a large-capacity battery can achieve a low-dropout charging for a small-capacity battery, thereby reducing the power consumption caused by a large-dropout during the charging process, which is conducive to improving the operating time of the electronic device.

Figure 7:
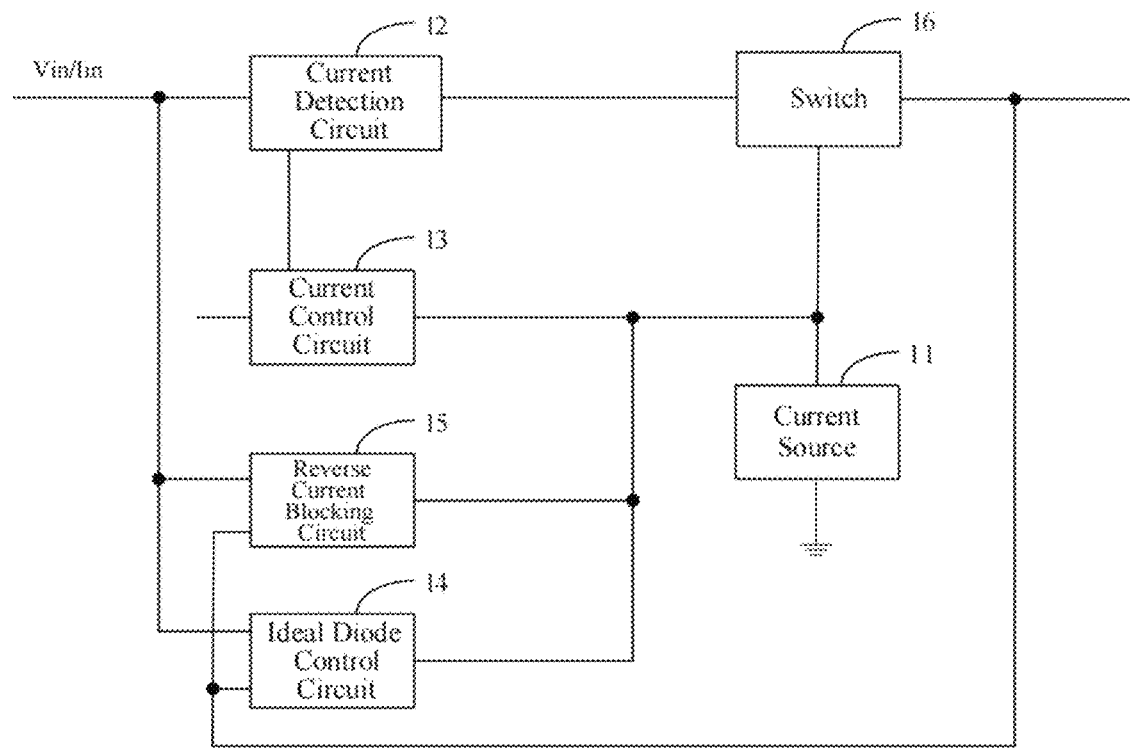
FIG. 7 is a block diagram of another structure of a linear charging circuit in accordance with an embodiment of the present application.

As shown in FIG. 7, the linear charging circuit described above may also include a current source 11.

The current source 11, being connected to the reverse current blocking circuit 15, the ideal diode control circuit 14, the current control circuit 13 and the switch 16, is configured to provide a bias current for the gate of the switch 16.

In a specific implementation, the reverse current blocking circuit 15 may include a comparator, and the threshold voltage is greater than an offset voltage of the comparator.

The critical voltage is greater than the offset voltage of the comparator, and the ideal diode control circuit 14 controls the drain-source voltage drop of the switch 16 to stabilize at the critical voltage when the constant current Iin is smaller than the critical current and the battery voltage is smaller than the first threshold voltage, such that it prevents the reverse current blocking circuit 15 from turning off the switch 16 by mistake when the constant current Iin is a relatively small current (smaller than the critical current) and the battery voltage is smaller than the first threshold voltage, thereby maintaining a constant current charging of the battery at a low-dropout under the relatively small constant current Iin.

As an example rather than a limitation, the switch 16 may be an enhanced P-type metal-oxide-semiconductor (positive channel Metal Oxide Semiconductor, PMOS).

The current control circuit 13 is specifically configured to output a first cut-off control voltage to increase the on-resistance of the switch 16 when the sampling current is greater than the first reference current, thereby controlling the charging current output from the switch 16 to stabilize at the first reference current. The current control circuit 13 is also configured to stop an output of the first cut-off control voltage to control the switch 16 to transmit the constant current Iin as the charging current of the battery when the sampling current is smaller than the first reference current and the constant current Iin is greater than or equal to the critical current.

It is worth noting that in the actual application process, the constant current Iin is smaller than a preset value to satisfy that the sampling current is smaller than or equal to the first reference current. Through the current control circuit 13, the constant current Iin serves as the charging current is achieved when the constant current Iin is a relatively large current (the constant current Iin is greater than the critical current and smaller than the first reference current). The large current input and output characteristics of an ideal diode are simulated.

The ideal diode control circuit 14 is specifically configured to output a second cut-off control voltage to increase the on-resistance of the switch 16, when the constant current Iin is smaller than the critical current and the battery voltage is smaller than the threshold voltage (a decrease of the constant current Iin, resulting in that the drain-source voltage drop is smaller than the first threshold voltage), so as to control the drain-source voltage drop of the switch 16 to stabilize at the critical voltage.

The ideal diode control circuit 14 controls the drain-source voltage drop of the switch 16 to stabilize at the critical voltage, that is, the voltage difference between the input voltage Vin and the battery voltage equals to the critical voltage, and the critical voltage is the product of the critical current and the on-resistance of the switch 16 when the switch 16 is saturated (the critical voltage is a low dropout), so that, through the ideal diode control circuit 14, the battery is charged with a low current when the constant current Iin is a relatively small current (namely, when the constant current Iin is smaller than the critical current).

The reverse current blocking circuit 15 is specifically configured to output a third cut-off control voltage to control the switch 16 to be turned off when inputs of the constant current Iin and the constant voltage Vin are stopped.

The switch 16 is controlled to be turned off through the reverse current blocking circuit 15 to prevent current from flowing from the small-capacity battery to the input end of the small-capacity battery subsystem.

Figure 8:
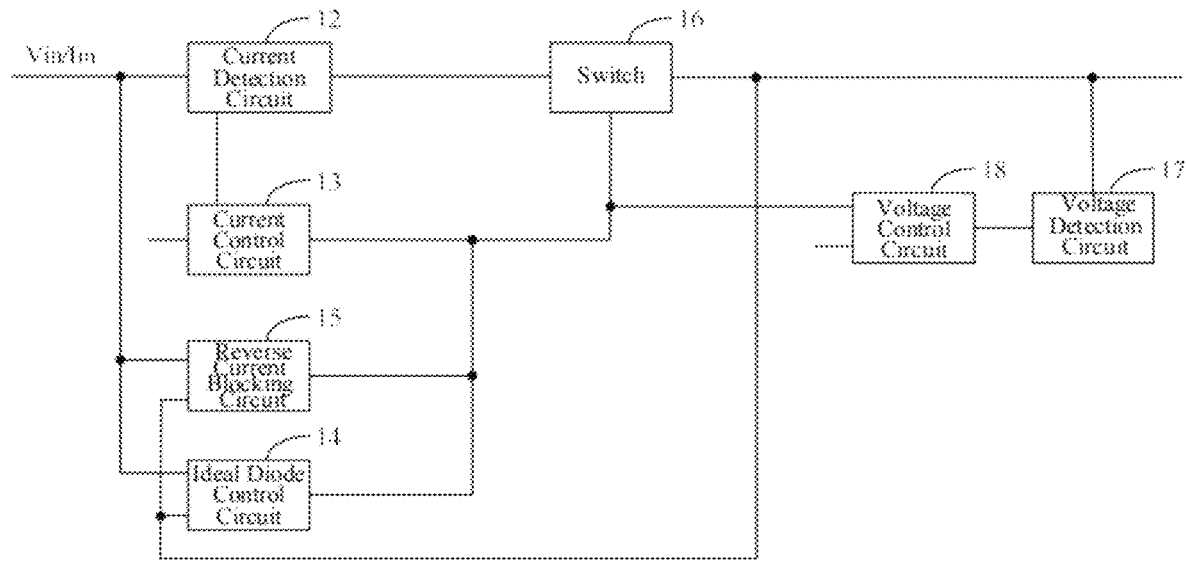
FIG. 8 is a block diagram of yet another structure of a linear charging circuit in accordance with an embodiment of the present application.

As shown in FIG. 8, the linear charging circuit also includes a voltage detection circuit 17 and a voltage control circuit 18.

The voltage detection circuit 17, being connected to the switch 16, is configured to detect the battery voltage to output a voltage detection signal.

The voltage control circuit 18, being connected to the voltage detection circuit 17, the reverse current blocking circuit 15, the ideal diode control circuit 14, the current control circuit 13 and the switch 16, is configured to control the charging voltage output from the switch 16 to stabilize at a constant voltage when the voltage detection signal is greater than or equal to the second threshold voltage. In which, the voltage detection signal is the second threshold voltage, when the battery voltage is the first threshold voltage.

Through the voltage detection circuit 17 and the voltage control circuit 18, it is possible to switch from the constant current charging to the constant voltage charging without involving a microprocessor for communication, when the battery voltage is equal to the first threshold voltage.

The voltage control circuit 18 is specifically configured to output a fourth cut-off control voltage to adjust the on-resistance of the switch 16 when the voltage detection signal is greater than or equal to the threshold voltage, thereby controlling the charging voltage output from the switch 16 to stabilize at a constant voltage.

As the charging progresses, the battery voltage becomes higher and higher, and so does the voltage detection signal. When the voltage detection signal is greater than or equal to the threshold voltage, the fourth cut-off control voltage is output to adjust the on-resistance of the switch 16, thereby adjusting the drain-source voltage drop of the switch 16 so that the charging voltage output from the switch 16 can be controlled to stabilize at the constant voltage to realize the constant voltage charging.

Figure 9:
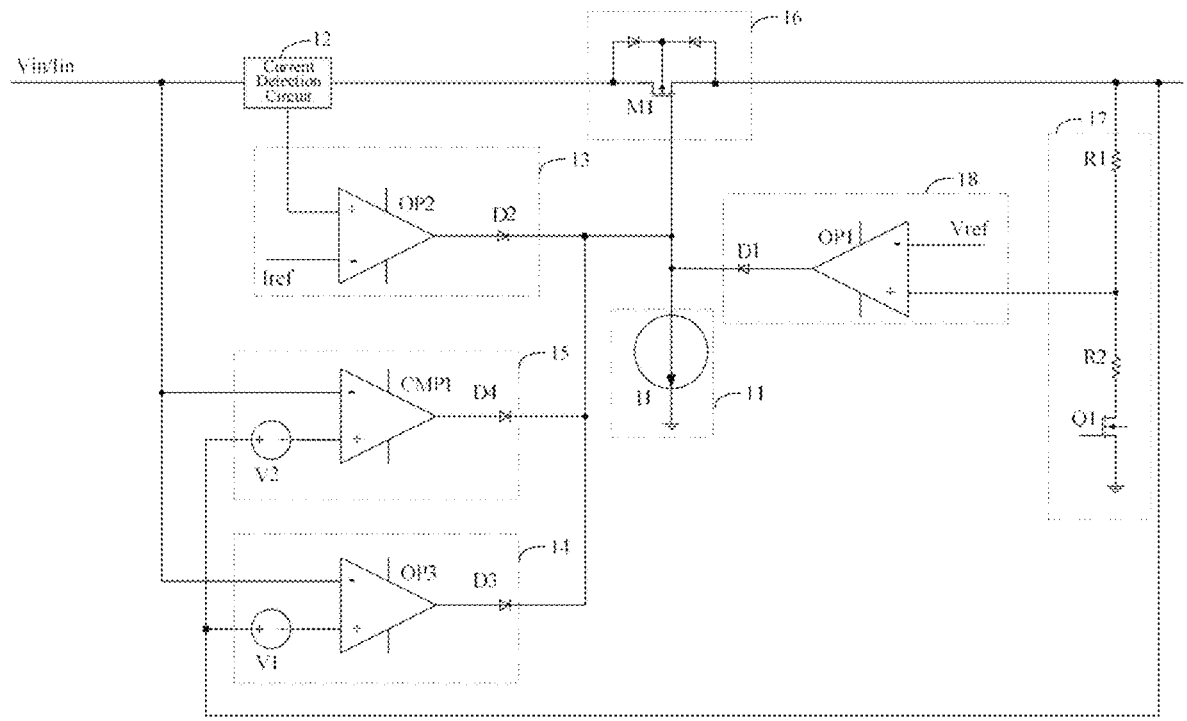
FIG. 9 is an exemplary schematic circuit diagram of a linear charging circuit in accordance with an embodiment of the present application.

FIG. 9 shows an example circuit structure of a linear charging circuit in accordance with an embodiment of the present application. For ease of description, only parts related to the embodiment of the present application are described in detail here.

The switch 16 may be a first field effect transistor (FET) M1.

The voltage detection circuit 17 includes a second field effect transistor Q1, a first resistor R1, and a second resistor R2. A first end of the first resistor R1 is connected to a battery voltage input end of the voltage detection circuit 17. A second end of the first resistor R1, a first end of the second resistor R2 are connected in common to a voltage detection signal input end of the voltage detection circuit 17. A second end of the second resistor R2 is connected to a drain of the second field effect transistor Q1. A source of the second field effect transistor Q1 is connected to the ground of the power source.

The second field effect transistor Q1 can be turned off after the charging is completed to prevent leakage current.

The voltage control circuit 18 includes a first operational amplifier OP1 and a first diode D1. An inverting input end of the first operational amplifier OP1 is connected to a threshold voltage input end of the voltage control circuit 18, and a non-inverting input end of the first operational amplifier OP1 is connected to a voltage detection signal input end of the voltage control circuit 18. An output end of the first operational amplifier OP1 is connected to the anode of the first diode D1, and the cathode of the first diode D1 is connected to a fourth cut-off control voltage output end of the voltage control circuit 18.

Through the above-mentioned voltage control circuit 18, the voltage detection signal is stabilized at the threshold voltage, that is, the constant charging voltage is realized.

The current control circuit 13 includes a second operational amplifier OP2 and a second diode D2. A non-inverting input end of the second operational amplifier OP2 is connected to a sampling current input end of the current control circuit 13, and a non-inverting input end of the second operational amplifier OP2 is connected to a first reference current input end of the current control circuit 13. An output end of the second operational amplifier OP2 is connected to the anode of the second diode D2, and the cathode of the second diode D2 serves as a first cut-off control voltage output end of the current control circuit 13.

Through the above-mentioned second operational amplifier OP2 and the second diode D2, the output of the high-level first cut-off control voltage is stopped when the sampling current is smaller than the first reference current and the constant current Iin is greater than or equal to the critical current, so that the first FFT M1 transmits a constant current Iin.

The ideal diode control circuit 14 includes a third operational amplifier OP3, a first voltage source V1, and a third diode D3. The anode of the first voltage source V1 is connected to a battery voltage input end of the ideal diode control circuit 14, and the cathode of the first voltage source V1 is connected to a non-inverting input end of the third operational amplifier OP3. An inverting input end of the third operational amplifier OP3 is connected to a constant voltage input end of the ideal diode control circuit 14, an output end of the third operational amplifier OP3 is connected to an anode of the third diode D3, and a cathode of the third diode D3 is connected to a second cut-off control voltage output end of the ideal diode control circuit 14. The voltage of the first voltage source V1 serves as the threshold voltage.

The reverse current blocking circuit 15 includes a comparator CMP1, a second voltage source V2, and a fourth diode D4. A non-inverting input end of the comparator CMP1 is connected to a negative pole of the second voltage source V2, and a positive pole of the second voltage source V2 is connected to a battery voltage input end of the reverse current blocking circuit 15. An inverting input end of the comparator CMP1 is connected to a constant voltage input end. An output end of the comparator CMP1 is connected to an anode of the fourth diode D4. A cathode of the fourth diode D4 is connected to a third cut-off control voltage output end of the reverse current blocking circuit 15.

The following is a further description of FIG. 9 in combination with the working principle:

Since the first FFT M1 is a PMOS transistor, the first FFT M1 is turned on when the gate of the first FFT M1 is at a low level, and the first field effect transistor is turned off when the gate of the first FFT M1 is at a high level.

The current detection circuit 12 detects the constant current Iin to output a sampling current.

When the sampling current is greater than the first reference current Iref, a high-level first cut-off control voltage is output to increase the on-resistance of the first FET M1, thereby controlling the charging current output from the first FFT M1 to stabilize at the first reference current. When the sampling current is smaller than or equal to the first reference current Iref and the constant current Iin is greater than or equal to the critical current, stop outputting the high-level first cut-off control voltage, and the gate of the first FFT M1 is at a low level, thereby the first FET M1 is controlled to be turned on to transmit the constant current Iin as the charging current of the battery.

Since the voltage of the first voltage source V1 is the critical voltage, and the critical voltage is the product of the critical current and the on-resistance when the switch 16 is saturated (that is, the critical current is the quotient of the critical voltage divided by the on-resistance when the switch 16 is saturated), the constant current Iin is smaller than the critical current, that is, the constant voltage Vin is smaller than the sum of the battery voltage and the critical voltage. When the constant voltage Vin is smaller than the sum of the battery voltage and the critical voltage and the battery voltage is smaller than the first threshold voltage, a high-level second cut-off control voltage is output to increase the on-resistance of the first FFT M1, thereby controlling the drain-source voltage drop of the first FFT M1 to stabilize at the critical voltage (namely, the voltage of the first voltage source V1).

When inputs of the constant current Iin and the constant voltage Vin are stopped, since the voltage at the non-inverting input end of the comparator CMP1 is greater than the voltage at the inverting input end of the comparator CMP1, the comparator CMP1 outputs a high-level third cut-off control voltage to control the switch 16 to be turned off.

When the constant current Iin is smaller than the critical current (the quotient of the critical voltage divided by the on-resistance when the switch 16 is saturated), the drain-source voltage drop of the first FET M1 stabilizes at the critical voltage (the voltage of the first voltage source V1), and the voltage of the first voltage source V1 is greater than the voltage of the second voltage source V2 (the offset voltage of the comparator CMP1). Such that the comparator CMP1 stops outputting the third high-level cut-off control voltage when the constant current Iin is smaller than the critical current, thereby preventing the switch 16 from being turned off by mistake under a small constant current Iin, and maintaining the constant current charging of the battery at a low voltage drop under the small constant current Iin.

An embodiment of the present application also provides an electronic device, including the above-mentioned system for charging a small-capacity battery from a large-capacity battery. Specifically, the electronic device may be a headset or an electronic cigarette or other electronic devices equipped with a dual battery subsystem, which is not limited here.

Figure 10:
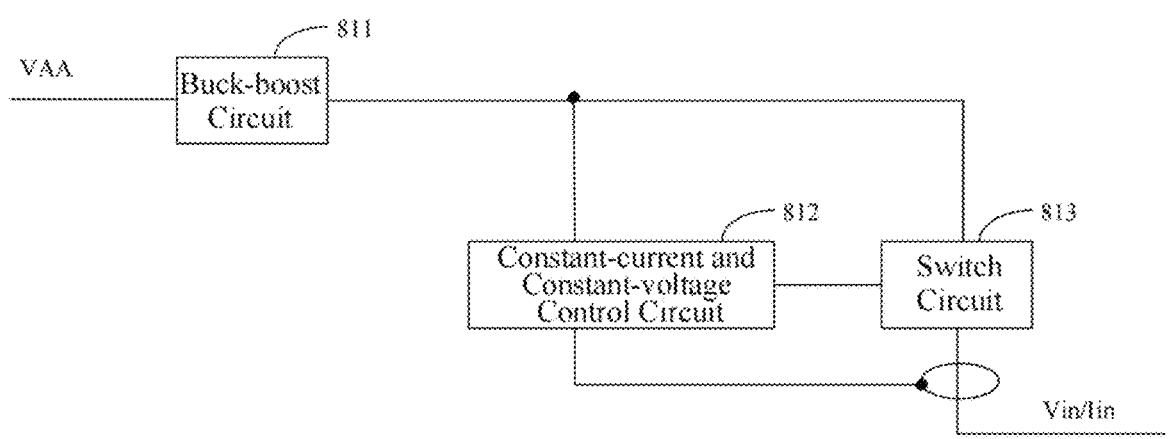
FIG. 10 is a block diagram of a constant-voltage and constant-current circuit in a large-capacity battery subsystem in accordance with an embodiment of the present application.

FIG. 10 is a block diagram of a constant-voltage and constant-current circuit in a large-capacity battery subsystem in accordance with an embodiment of the present application. The constant-voltage and constant-current circuit 81 in the large-capacity battery subsystem includes a buck-boost circuit 811, a constant-current and constant-voltage control circuit 812 and a switch circuit 813.

The buck-boost circuit 811 is configured to increase or reduce the input voltage VAA of the large-capacity battery to output a first voltage.

The constant-current and constant-voltage control circuit 812, being connected to the buck-boost circuit 811, is configured to output a constant-current and constant-voltage control signal.

The switch circuit 813, being connected to the buck-boost circuit 811 and the constant-current and constant-voltage control circuit 812, is configured to convert the first voltage into either a constant voltage Vin or a constant current Iin according to the constant-current and constant-voltage control signal.

The switch circuit 813 is controlled by the constant-current and constant-voltage control circuit 812 to convert the first voltage into the constant voltage Vin or the constant current Iin, so as to achieve a constant current or a constant voltage.

The embodiment of the present application includes a large-capacity battery subsystem and a small-capacity battery subsystem. The large-capacity battery subsystem and the small-capacity battery subsystem cooperate with each other in different stages of a charging cycle of the small-capacity battery. The large-capacity battery subsystem includes a constant-voltage and constant-current circuit, a large-capacity battery and a large-capacity battery charging circuit. The constant-voltage and constant-current circuit is configured to generate a constant voltage or constant current using energy in the large-capacity battery and supply the constant voltage or the constant current to the small-capacity battery subsystem as a power input. The large-capacity battery charging circuit is configured to charge the large-capacity battery. The small-capacity battery subsystem includes a linear charging circuit having ideal diode characteristics and a small-capacity battery. The linear charging circuit having ideal diode characteristics is configured to charge the small-capacity battery using the constant voltage or constant current output from the large-capacity battery subsystem. The charging cycle of the small-capacity battery is divided into a CC stage and a CV stage. The linear charging circuit having ideal diode characteristics in the current stage exhibits ideal diode characteristics, and the linear charging circuit having ideal diode characteristics in the CV stage meets the linear charging characteristics. In the CC stage, the large-capacity battery subsystem outputs a constant current. When the charging cycle of the small-capacity battery enters into the CV stage, the large-capacity battery subsystem outputs a constant voltage. In the constant-current stage, the voltage difference between the input voltage and the output voltage of the small-capacity battery charging circuit is very low, such that high efficiency can be achieved, and the waste of battery energy can be reduced, thereby increasing the operating time of the large-capacity battery. Also, due to high efficiency, a large charging current is allowed without generating a large amount of heat, thereby achieving fast charging. In the CV stage, the large-capacity battery subsystem outputs a constant voltage slightly higher (such as 300 mV) than the small-capacity battery voltage to achieve high efficiency; and the high efficiency can be achieved without involving a microprocessor for communication.

It should be understood that the sequence number of each step in the foregoing embodiment does not mean the order of execution. The execution sequence of each process should be determined based on its function and internal logic, and should not constitute any limitation on the implementation process of the embodiment of the present application.

The above-mentioned embodiments are merely used for illustrating the technical solutions of the present application, and are not intended to limit the present application. Although this application has been described in detail with reference to the foregoing embodiments, it should be understood that for those of ordinary skill in the art, the technical solutions recorded in varies embodiments as aforementioned can be modified, or some of the technical features can be equivalently replaced. These modifications or replacements do not cause the essence of the corresponding technical solutions to deviate from the spirit and scope of the technical solutions of the embodiments of the present application, and should be included within the protection scope of the present application.

What is claimed is:

1. A system for charging a small-capacity battery from a large-capacity battery, comprising:
    a large-capacity battery subsystem, comprising:
        a large-capacity battery;
        a large-capacity battery charging circuit, configured to charge the large-capacity battery; and
        a constant-voltage and constant-current circuit, configured to generate a constant voltage or a constant current using energy in the large-capacity battery and supply the constant voltage or the constant current to a small-capacity battery subsystem as a power input; and
    wherein the small-capacity battery subsystem, comprises:
        a small-capacity battery; and
        a linear charging circuit having ideal diode characteristics, configured to charge the small-capacity battery using the constant voltage or the constant current output from the large-capacity battery subsystem;
    wherein the large-capacity battery subsystem and the small-capacity battery subsystem cooperate with each other in different stages of a charging cycle of the small-capacity battery;
    wherein the charging cycle of the small-capacity battery comprises a constant-current stage and a constant-voltage stage, the linear charging circuit having ideal diode characteristics in the constant-current stage meets the ideal diode characteristics, and the linear charging circuit having ideal diode characteristics in the constant-voltage stage meets linear charging characteristics; and
    wherein the large-capacity battery subsystem is configured to output a constant current in the constant-current stage of the small-capacity battery; and the large-capacity battery subsystem is configured to output a constant voltage when the charging cycle of the small-capacity battery enters into the constant-voltage stage.

2. The system for charging a small-capacity battery from a large-capacity battery according to claim 1, wherein the linear charging circuit having ideal diode characteristics comprises:
    a switch;
    a current detection circuit, configured to detect the constant current to output a sampling current;
    a current control circuit, being connected to the switch, and configured to control the switch to transmit the constant current as a charging current of the battery, when the sampling current is smaller than or equal to a first reference current and the constant current is greater than or equal to a critical current, wherein the first reference current is greater than the critical current;
    an ideal diode control circuit, being connected to the current control circuit and the switch, and configured to control a drain-source voltage drop of the switch to stabilize at a critical voltage when the constant current is smaller than the critical current and a battery voltage is smaller than a first threshold voltage; wherein the critical voltage is a product of the critical current and an on-resistance of the switch when the switch is saturated; and
    a reverse current blocking circuit, being connected to the ideal diode control circuit, the current control circuit and the switch, and configured to control the switch to be turned off when a charging process is stopped.

3. The system for charging a small-capacity battery from a large-capacity battery according to claim 2, wherein the reverse current blocking circuit comprises a comparator, and the threshold voltage is greater than an offset voltage of the comparator.

4. The system for charging a small-capacity battery from a large-capacity battery according to claim 2, wherein the current control circuit is further configured to:
output a first cut-off control voltage to increase the on-resistance of the switch when the sampling current is greater than the first reference current, so as to control the charging current output from the switch to stabilize at the first reference current; and
stop outputting the first cut-off control voltage to control the switch to transmit the constant current as the charging current of the battery, when the sampling current is smaller than or equal to the first reference current and the constant current is greater than or equal to the critical current.

5. The system for charging a small-capacity battery from a large-capacity battery according to claim 2, wherein the ideal diode control circuit is further configured to output a second cut-off control voltage to increase the on-resistance of the switch when the constant current is smaller than the critical current and the battery voltage is smaller than the threshold voltage, so as to control the drain-source voltage drop of the switch to stabilize at the critical voltage.

6. The system for charging a small-capacity battery from a large-capacity battery according to claim 2, wherein the reverse current blocking circuit is further configured to output a third cut-off control voltage to control the switch to be turned off when the input of the constant voltage or the constant current is stopped.

7. The system for charging a small-capacity battery from a large-capacity battery according to claim 2, wherein the switch is an enhanced P-type metal-oxide-semiconductor.

8. The system for charging a small-capacity battery from a large-capacity battery according to claim 2, wherein the linear charging circuit further comprises:
a voltage detection circuit, being connected to the switch, and configured to detect the battery voltage to output a voltage detection signal; and
a voltage control circuit, being connected to the voltage detection circuit, the reverse current blocking circuit, the ideal diode control circuit, the current control circuit and the switch, and configured to control the charging voltage output from the switch to stabilize at the constant voltage when the voltage detection signal is greater than or equal to a second threshold voltage, wherein the voltage detection signal is equal to the second threshold voltage when the battery voltage is equal to the first threshold voltage.

9. The system for charging a small-capacity battery from a large-capacity battery according to claim 8, wherein the voltage control circuit is further configured to output a fourth cut-off control voltage to adjust the on-resistance of the switch is when the voltage detection signal is greater than or equal to the threshold voltage, so as to control the charging voltage output from the switch to stabilize at the constant voltage.

10. The system for charging a small-capacity battery from a large-capacity battery according to claim 2, wherein the linear charging circuit further comprises:
a current source, being connected to the reverse current blocking circuit, the ideal diode control circuit, the current control circuit and the switch, and configured to provide a bias current for a gate of the switch.

11. An electronic device, comprising a system for charging a small-capacity battery from a large-capacity battery, and the system comprising:
a large-capacity battery subsystem, comprising:
a large-capacity battery;
a large-capacity battery charging circuit, configured to charge the large-capacity battery; and
a constant-voltage and constant-current circuit, configured to generate a constant voltage or a constant current using energy in the large-capacity battery and supply the constant voltage or the constant current to a small-capacity battery subsystem as a power input; and
wherein the small-capacity battery subsystem, comprises:
a small-capacity battery; and
a linear charging circuit having ideal diode characteristics, configured to charge the small-capacity battery using the constant voltage or the constant current output from the large-capacity battery subsystem;
wherein the large-capacity battery subsystem and the small-capacity battery subsystem cooperate with each other in different stages of a charging cycle of the small-capacity battery;
wherein the charging cycle of the small-capacity battery comprises a constant-current stage and a constant-voltage stage, the linear charging circuit having ideal diode characteristics in the constant-current stage meets the ideal diode characteristics, and the linear charging circuit having ideal diode characteristics in the constant-voltage stage meets linear charging characteristics; and
wherein the large-capacity battery subsystem is configured to output a constant current in the constant-current stage of the small-capacity battery; and the large-capacity battery subsystem is configured to output a constant voltage when the charging cycle of the small-capacity battery enters into the constant-voltage stage.

12. The electronic device according to claim 11, wherein the linear charging circuit having ideal diode characteristics comprises:
a switch;
a current detection circuit, configured to detect the constant current to output a sampling current;
a current control circuit, being connected to the switch, and configured to control the switch to transmit the constant current as a charging current of the battery, when the sampling current is smaller than or equal to a first reference current and the constant current is greater than or equal to a critical current, wherein the first reference current is greater than the critical current;
an ideal diode control circuit, being connected to the current control circuit and the switch, and configured to control a drain-source voltage drop of the switch to stabilize at a critical voltage when the constant current is smaller than the critical current and a battery voltage is smaller than a first threshold voltage; wherein the critical voltage is a product of the critical current and an on-resistance of the switch when the switch is saturated; and
a reverse current blocking circuit, being connected to the ideal diode control circuit, the current control circuit and the switch, and configured to control the switch to be turned off when a charging process is stopped.

13. The electronic device according to claim 12, wherein the reverse current blocking circuit comprises a comparator, and the threshold voltage is greater than an offset voltage of the comparator.

14. The electronic device according to claim 12, wherein the current control circuit is further configured to:
   output a first cut-off control voltage to increase the on-resistance of the switch when the sampling current is greater than the first reference current, so as to control the charging current output from the switch to stabilize at the first reference current; and
   stop outputting the first cut-off control voltage to control the switch to transmit the constant current as the charging current of the battery, when the sampling current is smaller than or equal to the first reference current and the constant current is greater than or equal to the critical current.

15. The electronic device according to claim 12, wherein the ideal diode control circuit is further configured to output a second cut-off control voltage to increase the on-resistance of the switch when the constant current is smaller than the critical current and the battery voltage is smaller than the threshold voltage, so as to control the drain-source voltage drop of the switch to stabilize at the critical voltage.

16. The electronic device according to claim 12, wherein the reverse current blocking circuit is further configured to output a third cut-off control voltage to control the switch to be turned off when the input of the constant voltage or the constant current is stopped.

17. The electronic device according to claim 12, wherein the switch is an enhanced P-type metal-oxide-semiconductor.

18. The electronic device according to claim 12, wherein the linear charging circuit further comprises:
   a voltage detection circuit, being connected to the switch, and configured to detect the battery voltage to output a voltage detection signal; and
   a voltage control circuit, being connected to the voltage detection circuit, the reverse current blocking circuit, the ideal diode control circuit, the current control circuit and the switch, and configured to control the charging voltage output from the switch to stabilize at the constant voltage when the voltage detection signal is greater than or equal to a second threshold voltage, wherein the voltage detection signal is equal to the second threshold voltage when the battery voltage is equal to the first threshold voltage.

19. The electronic device according to claim 18, wherein the voltage control circuit is further configured to output a fourth cut-off control voltage to adjust the on-resistance of the switch is when the voltage detection signal is greater than or equal to the threshold voltage, so as to control the charging voltage output from the switch to stabilize at the constant voltage.

20. The electronic device according to claim 12, wherein the linear charging circuit further comprises:
   a current source, being connected to the reverse current blocking circuit, the ideal diode control circuit, the current control circuit and the switch, and configured to provide a bias current for a gate of the switch.

\* \* \* \* \*